United States Patent
Li et al.

(10) Patent No.: US 10,253,394 B2
(45) Date of Patent: Apr. 9, 2019

(54) METHOD FOR TREATING SOLUTION CONTAINING RARE EARTH

(71) Applicant: NANCHANG UNIVERSITY, Nanchang (CN)

(72) Inventors: Yongxiu Li, Nanchang (CN); Ailing Xie, Nanchang (CN); Yue Wang, Nanchang (CN); Lisha Song, Nanchang (CN); Yilin Li, Nanchang (CN); Xinmu Zhou, Nanchang (CN); Xuezhen Zhou, Nanchang (CN); Yanzhu Liu, Nanchang (CN); Jing Li, Nanchang (CN)

(73) Assignee: Nanchang University, Nanchang (CN)

( * ) Notice: Subject to any disclaimer, the term of this patent is extended or adjusted under 35 U.S.C. 154(b) by 786 days.

(21) Appl. No.: 14/431,753

(22) PCT Filed: Dec. 24, 2013

(86) PCT No.: PCT/CN2013/090371
§ 371 (c)(1),
(2) Date: Mar. 26, 2015

(87) PCT Pub. No.: WO2015/021727
PCT Pub. Date: Feb. 19, 2015

(65) Prior Publication Data
US 2016/0153069 A1    Jun. 2, 2016

(30) Foreign Application Priority Data

Aug. 15, 2013 (CN) .......................... 2013 1 0355981
Sep. 5, 2013 (CN) .......................... 2013 1 0400389

(51) Int. Cl.
C22B 59/00 (2006.01)
C22B 3/24 (2006.01)
(Continued)

(52) U.S. Cl.
CPC .............. *C22B 59/00* (2013.01); *C02F 1/281* (2013.01); *C22B 3/24* (2013.01); *C22B 7/006* (2013.01);
(Continued)

(58) Field of Classification Search
CPC .................................. C22B 59/00; C22B 3/24
See application file for complete search history.

(56) References Cited

FOREIGN PATENT DOCUMENTS

| CN | 86106797 A | 4/1988 |
|---|---|---|
| CN | 103449568 A | 12/2013 |
| CN | 103466738 A | 12/2013 |

OTHER PUBLICATIONS

Chegrouche et al., Removal of Lanthanum from Aqueous Solutions by Natural Bentonite, Wat. Res. vol. 31, No. 7 (1733-1737) (Year: 1997).*

(Continued)

*Primary Examiner* — Melissa S Swain
(74) *Attorney, Agent, or Firm* — Womble Bond Dickinson (US) LLP

(57) ABSTRACT

The present invention provides a treating method for a solution containing rare earth, wherein the method comprising: (1) performing a fine-grained clay adsorption on the solution containing rare earth with fine-grained clay, the conditions of the fine-grained clay adsorption allow that solution adsorbed by said fine-grained clay contains rare earth with a concentration calculated by rare earth oxides not higher than 1 mg/L; (2) performing a coarse-grained clay adsorption on the solution adsorbed by said fine-grained clay with coarse-grained clay, the conditions of coarse-grained clay adsorption allow that solution adsorbed by said coarse-grained clay contains rare earth with a concentration calculated by rare earth oxides not higher than 0.5 mg/L; the grain diameter of at least 90% of said fine-grained clay particles (Continued)

is smaller than the grain diameter of said coarse-grained clay particles, and the grain diameter of said fine-grained clay is within a range of 1-250 μm, and the grain diameter of said coarse-grained clay is within a range of 150-1,000 μm; and (3) desorbing rare earth from said fine-grained clay undergone the fine-grained clay adsorption and said coarse-grained clay undergone the coarse-grained clay adsorption. The rare earth may be effectively recycled by applying the above method.

18 Claims, 2 Drawing Sheets

(51) Int. Cl.
    *C02F 1/28*     (2006.01)
    *C22B 7/00*     (2006.01)
    *C02F 101/10*   (2006.01)
    *C02F 101/16*   (2006.01)
    *C02F 103/06*   (2006.01)
    *C02F 103/10*   (2006.01)

(52) U.S. Cl.
    CPC ...... *C02F 2101/10* (2013.01); *C02F 2101/16* (2013.01); *C02F 2103/06* (2013.01); *C02F 2103/10* (2013.01); *Y02P 10/234* (2015.11)

(56) References Cited

OTHER PUBLICATIONS

Iannicelli-Zubiani, Waste Management 46 (546-556). (Year: 2015).*
PCT International Search Report for PCT Counterpart Application No. PCT/CN2013/090371, 5 pgs. (including English translation), (dated May 21, 2014).
Ailing Xie, et al., "Heap Leaching Tailings of Iron-absorbed Rare Earth Deposit for the Recovery and Enrichment of Low-Concentration Rare Earth", Proceedings of 2013 Symposium on Chemistry and Chemical Engineering in Central and Western Regions, p. 179, (Apr. 23, 2013).

* cited by examiner

METHOD FOR TREATING SOLUTION CONTAINING RARE EARTH

CROSS-REFERENCE TO RELATED APPLICATIONS

This patent application is a U.S. National Phase Application under 35 U.S.C. § 371 of International Application No. PCT/CN2013/090371, filed Dec. 24, 2013, entitled METHOD FOR TREATING SOLUTION CONTAINING RARE EARTH, which claims priority to Chinese Patent Application No. 201310355981.7, filed Aug. 15, 2013, and Chinese Patent Application No. 201310400389.4, filed Sep. 5, 2013.

FIELD OF THE INVENTION

The present invention relates to a method for treating solution containing rare earth.

BACKGROUND OF THE INVENTION

Rare earths are widely used in various fields such as industry, military and agriculture, the rare earth functional materials developing rapidly in the recent decades have played an irreplaceable role in the high and new technical industries as well as military and astronautic technologies, which makes rare earths become a globally recognized strategic resource. Rare earth is a non-renewable natural resource, but the demand for rare earth is ever-increasing due to the strengthened effort for developing its materials. However, the high-grade rare earth ores and rare earth reserves are dwindling. Therefore, it has attracted extensive attention and researches on the technologies of effectively extracting rare earth with respect to low-grade rare earth mines and the technologies of recycling rare earth from wastewater containing a low concentration of rare earth which is generated during the production process. Given that the requirements of protecting resources and ecological environment become rigorous, it is obviously urgent to research and develop the recycling technology with respect to solution containing a low concentration of rare earth and the technology of treating wastewater to reach standard of effluent discharge.

The mining wastewater produced accompanied exploitation process of the ion adsorption rare earth deposits and subsequent trickle leaching process with rain water generally contains a low concentration of residual rare earth and a certain concentration of ammonia nitrogen, and the large amount of waste water are difficult to be treated. For example, the analysis result of the river water in a rare earth mining area in Jiangxi Province in May illustrates following content: the concentration of rare earth calculated by rare earth oxides (REO) is 30 mg/L, the concentration of ammonia calculated by nitrogen (N) is 51 mg/L. If the residual rare earth has not been recycled, which is bound to accelerate the loss process of rare earth, and result in an increased content of rare earth and electrolyte in the water environment in the mining area and even the downstream living quarters, thus the ecological environment is destroyed, and the water safety is under threat. Because of the widespread presence of weathering crusts, there are many ion adsorption rare earth deposits on a global scale which are similar with those reserved in the southern China, while its content of rare earth is as lower as 10-300 mg/kg. Although the weathering crusts with minimal content of rare earth have not been exploited as the rare earth resources, it will become a kind of potential rare earth resources once the amount of other rare earth resources is reduced and the mining cost goes up. Moreover, the use of electrolyte in the producing processes of other industries and agro forestry will lead to the leaching of said ionic rare earth, the leached rare earth has the value of recycling use; if the leached rare earth is not treated, it will lead to environmental pollution either. In addition, given that the rare earth ions possess non-biodegradable property, the rare earth ions which are latent in the environment for a long time may enter human body by passing up the food chain, and the chronic accumulation of said rare earth ions in human body will result in various diseases and physiological disorder, thereby endanger human health.

Furthermore, the wastewater containing a low concentration of rare earth ions are produced in the rare earth separation enterprises and in some mineral processing and smelting processes, thus it is necessary to treat said wastewater and recycle the rare earth contained therein. For example, the wastewater contains enriched rare earth elements and a certain concentration of accompanied ammonia nitrogen in the procedure of processing minerals, for instance, bauxite, phosphate ore, zircon sand and ilmenite. The weathered clays associated with fluoride carbonate rare earth mines also contain a certain amount of rare earth, and some rare earth dissolves into solutions in the process of mineral separation and the contact process between the rare earth ore with the aqueous solution containing acid and ammonium. An indiscriminate discharge of these solutions containing rare earth will not only result in a waste of rare earth resources, but also bring forth severe threat on the ecological environment.

The methods of enriching and recycling rare earth have been widely researched and applied. At present, the methods primarily include precipitation, extraction, reverse osmosis and ion exchange resin, and the precipitation method is the simplest process among them. The precipitation process generally relates to neutralize the wastewater containing rare earth with lime such that the solution manifests alkalinity, thereby the rare earth is precipitated out in the form of hydroxide and is separated from a large amount of water. The pH value of large amount of water shall be regulated by adding into acidic substance so as to obtain the neutral solution available for discharging, and the formed sediment is in a colloidalstate with tiny particles, and thus it is difficult to recycle the rare earth; moreover the presence of calcium ions will impose pressure on the subsequent process of purification. Resin adsorption method is relatively simple, but it has the disadvantages such as the loading amount of resin is small, cost of resin is high, and the rare earth is hardly desorbed. The extraction method is relatively complicated, while the method has virtues of high efficiency and enrichment factor, it gives rise to many problems, for instance, its phase ratio is too small, the extraction agent suffers from severe loss in the course of dissolution, the cost is high and secondary pollution is serious.

At present, the methods for treating ammonia nitrogen in wastewater are mainly as follows: air stripping method, biological method, chemical precipitation method and break point chlorination method. The air stripping method can be used for efficiently removing nitrogen, but the ammonia nitrogen is not fundamentally removed. The biological method can produce a desirable effect, but the processing time is relatively long and the treatment process in the practical application is difficult to be controlled. Chemical precipitation method can be operated in a flexible manner and generate a desirable effect of removing ammonia nitrogen, while its cost is relatively high. The break point chlorination method is a very effective method, its reaction process may be illustrated as follows: $NH_4^+ + 1.5HOCl \rightarrow 0.5N_2 + 1.5H_2O + 2.5H^+ + 1.5°\ Cl^-$. The break point chlorination has the advantages that its treatment effect is stable and the process is not affected by temperature, and the equipment investment is low, and reaction is rapid and complete, and the process has an effect of disinfection. However, it imposes a high requirement on controlling the pH value, thus pH value control is the difficult point of applying the break point chlorination method.

SUMMARY OF THE INVENTION

The object of the present invention is to provide a treating method for a solution containing rare earth.

The present invention provides a treating method for a solution containing rare earth, wherein the method comprising:

(1) performing a fine-grained clay adsorption on the solution containing rare earth with fine-grained clay, the conditions of the fine-grained clay adsorption allow that solution adsorbed by said fine-grained clay contains rare earth with a concentration calculated by rare earth oxides not higher than 1 mg/L;

(2) performing a coarse-grained clay adsorption on the solution adsorbed by said fine-grained clay with coarse-grained clay, the conditions of the coarse-grained clay adsorption allow that solution adsorbed by said coarse-grained clay contains rare earth with a concentration calculated by rare earth oxides not higher than 0.5 mg/L; the grain diameter of at least 90% of said fine-grained clay particles is smaller than the grain diameter of said coarse-grained clay particles, and the grain diameter of said fine-grained clay is within a range of 1-250 μm, and the grain diameter of said coarse-grained clay is within a range of 150-1,000 μm;

(3) desorbing rare earth from said fine-grained clay undergone the fine-grained clay adsorption and said coarse-grained clay undergone the coarse-grained clay adsorption.

The inventors of the present invention have carried out an in-depth research and found that the rare earth can be effectively recycled from the solution containing a low concentration of rare earth by performing adsorption on the solution containing rare earth with the fine-grained clay and coarse-grained clay in a sequence.

According to one preferred embodiment of the present invention, when said fine-grained clay is a $Na^+$ type fine-grained clay and/or a $Na^+$—$H^+$ type fine-grained clay, and/or said coarse-grained clay is a $Na^+$ type coarse-grained clay and/or a $Na^+$—$H^+$ type coarse-grained clay, the concentration of rare earth in the solution may be dropped to a lower level, and the rare earth contained therein can be recycled in a more efficient manner.

According to another preferred embodiment of the present invention, when the fine-grained clay adsorption is a sedimentation adsorption, and the coarse-grained clay adsorption is a column bed adsorption, the treating method not only can efficiently recycle rare earth from the solution containing a low concentration of rare earth, but also facilitate a solid-liquid separation operation in the industrial processing procedures and save cost by reducing consumption of clay (s). The probable reasons may be as follows: the particle size of fine-grained clay is smaller, so if the fine-grained clay adsorption is applied in a column bed adsorption mode, the flow resistance is strong; however, when the sedimentation adsorption process is used by applying said fine-grained clay minerals as adsorbent and filter aid, the fine-grained clay not only may play its adsorbent role so as to allow the rare earth to be completely adsorbed and precipitated, but also aggregate the precipitated fine particles on the surface of said clay particles to produce an effect of co-precipitation, and enhance the precipitation property of particles, as a result, the sedimentation adsorption process not merely can perform an efficient recycling on the rare earth with reduced usage of fine-grained clay, but also facilitates the solid-liquid separation and significantly reduce the workload of filtering operation. In addition, the fine-grained clay manifests a large adsorption capacity, and when the solution containing rare earth is initially adsorbed with said fine-grained clay, it allows a majority of rare earth contained in the solution is attached on the fine-grained clay. On the contrary, although the coarse-grained clay has a relative small adsorbing capacity, the formed column bed exhibits good permeability. Therefore, when the coarse-grained clay adsorption is a column bed adsorption, the process is suitable for treating a large amount of wastewater solution with lower concentration of rare earth, so as to allow the residual rare earth in the solution adsorbed by said fine-grained clay to be basically adsorbed and removed by said coarse-grained clay.

According to another preferred embodiment of the present invention, when the solution containing rare earth further contains ammonia having a concentration calculated by nitrogen within a range of 20-500 mg/L, and the treating method for the solution containing rare earth further comprises a step of adding sodium hydroxide, sodium carbonate or sodium hypochlorite into said solution containing rare earth and performing reaction prior to the process of fine-grained clay adsorption and/or during the process of fine-grained clay adsorption, the added sodium hydroxide, sodium carbonate or sodium hypochlorite may regulate pH value of said solution containing rare earth and remove the ammonia nitrogen contained therein, thereby significantly lower the concentration of ammonia nitrogen in the solution containing rare earth on the basis of said process of recycling the rare earth.

Generally speaking, when the solution containing rare earth contains a relatively high concentration of ammonia nitrogen (200-500 mg/L), regulating pH value by applying sodium hydroxide or sodium carbonate alone during the process of fine-grained clay adsorption cannot reduce the concentration of ammonia nitrogen in said solution to a range, and the obtained solution adsorbed by said fine-grained clay still contain a certain amount of ammonia nitrogen (30-100 mg/L), and the solution may further contain a certain quantity of chloride ions and sodium ions; in another case, in the process of fine-grained clay adsorption, although the concentration of ammonia nitrogen can drop to a required range by regulating pH value with sodium hypochlorite, the obtained solution adsorbed by said fine-grained clay may contain chloride ions with a concentration of 100-3,000 mg/L and/or sodium ions with a concentration of 100-3,000 mg/L. Therefore, according to another preferred embodiment of the present invention, when the solution adsorbed by said fine-grained clay contains ammonia having a concentration calculated by nitrogen within a range of 30-100 mg/L, and/or chloride ions with a concentration of 100-3,000 mg/L, and/or sodium ions with a concentration of 100-3000 mg/L; the treating method for the solution containing rare earth further comprises a step of bipolar membrane electrodialysis of the solution adsorbed by said fine-grained clay after the process of fine-grained clay adsorption and prior to the coarse-grained clay adsorption, the concentration of chloride ions, sodium ions and ammonia nitrogen in the water obtained after bipolar membrane electrodialysis can be significantly reduced, thereby meet the wastewater discharge standards with higher requirements; in addition, the acid produced in the acidic chamber of bipolar membrane electrodialysis apparatus may be utilized for preparing the acidic sodium salt solution, the alkaline produced in the alkaline chamber thereof may be utilized in the process of recycling rare earth from the desorbed solution by means of the precipitation and extraction method, thus the present invention has widespread prospect of industrial application.

Other characteristics and advantages of the present invention will be further detailed in the embodiments hereunder.

BRIEF DESCRIPTION OF THE DRAWINGS

Drawings are used for providing further illustration on the present invention, and constitute a portion of the description, the drawings together with the following detailed description of the preferred embodiments aim at providing explanation for the present invention, but the present invention is not limited to the drawings. The drawings are as follows.

DETAILED DESCRIPTION OF THE PREFERRED EMBODIMENTS

Figure 1:
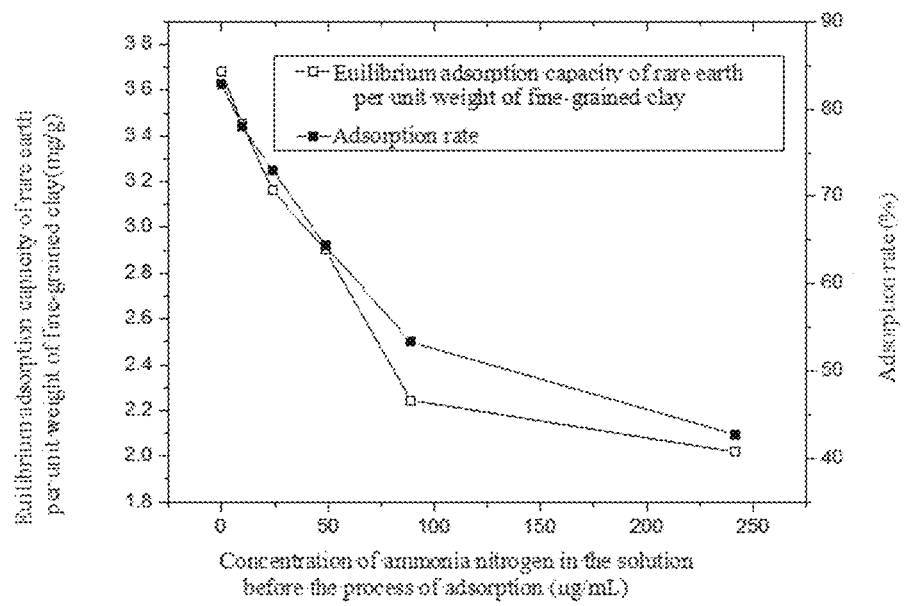
FIG. 1 is a result diagram illustrating the influence of different concentration of ammonia nitrogen on the effect of removing rare earth.

Hereunder the embodiments of the present invention will be detailed. It should be appreciated that the embodiments described here are only provided to describe and explain the present invention, but shall not be deemed as constituting any limitation to the present invention.

The present invention provides a treating method for a solution containing rare earth, wherein the method comprising:

(1) performing a fine-grained clay adsorption on the solution containing rare earth with fine-grained clay, the conditions of the fine-grained clay adsorption allow that solution adsorbed by said fine-grained clay contains rare earth with a concentration calculated by rare earth oxides not higher than 1 mg/L;

(2) performing a coarse-grained clay adsorption on the solution adsorbed by said fine-grained clay with coarse-grained clay, the conditions of the coarse-grained clay adsorption allow that solution adsorbed by said coarse-grained clay contains rare earth with a concentration calculated by rare earth oxides not higher than 0.5 mg/L; the grain diameter of at least 90% of said fine-grained clay particles is smaller than the grain diameter of said coarse-grained clay particles, and the grain diameter of said fine-grained clay is within a range of 1-250 μm, and the grain diameter of said coarse-grained clay is within a range of 150-1,000 μm;

(3) desorbing rare earth from said fine-grained clay undergone the fine-grained clay adsorption and said coarse-grained clay undergone the coarse-grained clay adsorption.

The fine-grained clay and coarse-grained clay generally comprise the skeleton with negative charge and combined ions with positive charge, wherein the combined ions with positive charge usually contain $H^+$, $Na^+$, $Mg^{2+}$, $K^+$, $Ca^{2+}$ and the like concurrently. Although both the fine-grained clay and coarse-grained clay possess adsorption ability to adsorb the rare earth in the solution containing rare earth when the combined ions with positive charge are one or more of the above-mentioned combined ions, said fine-grained clay is particularly preferable a $Na^+$ type fine-grained clay and/or a $Na^+$—$H^+$ type fine-grained clay, and/or said coarse-grained clay is particularly preferable a $Na^+$ type coarse-grained clay and/or a $Na^+$—$H^+$ type coarse-grained clay, so as to improve efficiency of adsorption, thereby the rare earth in the solution containing rare earth may be recycled in a more efficient manner. Wherein "the $Na^+$ type" refers to that the combined ions with positive charge in the clay are transformed into cation $Na^+$, while "$Na^+$—$H^+$ type" means that the combined ions with positive charge in the clay are transformed into cations $Na^+$ and $H^+$.

The $Na^+$ type fine-grained clay and the $Na^+$ type coarse-grained clay may be prepared with various methods which are well known to the person skilled in the art, for instance, the $Na^+$ type fine-grained clay and the $Na^+$ type coarse-grained clay may be prepared by immersing said fine-grained clay and coarse-grained clay with sodium chloride and/or sodium sulfate solution or allowing said fine-grained clay and coarse-grained clay to carry out a column exchange with sodium chloride and/or sodium sulfate solution, and they are preferably prepared by immersing said fine-grained clay and coarse-grained clay with sodium chloride and/or sodium sulfate solution, for the sake of operational simplicity and convenience. In particular, the concentration of said sodium chloride solution and sodium sulfate solution may be 0.3-3 mol/l, independently. In the process of immersion, the total usage of said sodium chloride solution and sodium sulfate solution may range from 1-5 ml relative to 1 g of said fine-grained clay or coarse-grained clay. Furthermore, the temperature of immersion may be within a range of 1-50° C., preferably 20-40° C.; the time of immersion may be 10-60 minutes, preferably 20-40 minutes.

In addition, the $Na^+$—$H^+$ type fine-grained clay and the $Na^+$—$H^+$ type coarse-grained clay may be prepared with various methods which are well known to the person skilled in the art, for instance, the $Na^+$—$H^+$ type fine-grained clay and the $Na^+$—$H^+$ type coarse-grained clay may be prepared by immersing said fine-grained clay and coarse-grained clay with acidic sodium chloride and/or sodium sulfate solution or allowing said fine-grained clay and coarse-grained clay to carry out a column exchange with acidic sodium chloride and/or sodium sulfate solution, and they are preferably prepared by immersing said fine-grained clay and coarse-grained clay with acidic sodium chloride and/or sodium sulfate solution, for the sake of operational simplicity and convenience. Said acidic sodium chloride and/or sodium sulfate solution is obtained by regulating pH value of said sodium chloride and/or sodium sulfate solution into an acidic range. In particular, the pH value of the acidic sodium chloride and/or sodium sulfate solution may be greater than zero, and less than or equal to 6, and its concentration may be within a range of 0.3-3 mol/L. In the process of immersion, the total usage of said acidic sodium chloride solution and sodium sulfate solution may range from 1-20 ml relative to 1 g of said fine-grained clay or coarse-grained clay. Furthermore, the temperature of immersion may be within a range of 1-50° C., preferably 20-40° C.; the time of immersion may be 10-60 minutes, preferably 20-40 minutes.

The fine-grained clay and coarse-grained clay may be a variety of clays in existence which is capable of adsorbing rare earth, for instance, it may be prepared by removing large grain minerals having a grain size more than 20 meshes (804 μm) from the mixed mineral in the natural world, and subsequently processing said mineral by means of a method of dry sieving or wet sieving. The major ingredients of said fine-grained clay and coarse-grained clay may be the same or different, and the ingredients of said fine-grained clay and coarse-grained clay are one or more selected from a group consisting of kaoline, halloysite, montmorillonite, zeolite, mica and feldspar independently, and the content of each ingredients varies with the place of origin. Wherein the feldspar contains one or more selected from the group consisting of potassium feldspar, sodium feldspar and calcium feldspar according to the diverse combined ions with positive charge.

According to the present invention, although the treating method for the solution containing rare earth may treat a variety of solution containing rare earth in existence and recycle the rare earth contained therein, there is the defect that the large quantity of wastewater with low concentration of rare earth can hardly be treated, and thus the solution containing rare earth preferably contains rare earth with a concentration calculated by rare earth oxides within a range of 5-300 mg/L, more preferably 20-100 mg/L, particularly preferable 40-60 mg/L.

Given that the fine-grained clay has a relatively large saturated adsorption capacity and a large resistance, said fine-grained clay adsorption is suitable for recycling rare earth contained in the rare earth solution by means of a process of sedimentation adsorption. The "sedimentation adsorption" refers to stirring and mixing the solution containing rare earth with fine-grained clay first, and then standing still and sedimentating the stirred and mixed solution. Wherein, the time of stirring and mixing may be 10-30 minutes, and the time of standing still and sedimentating may be 2-5 hours. Following the step of sedimentation adsorption, a solid-liquid separation step may be performed on the solution containing rare earth by means of clarifying and filtering, and the obtained solution adsorbed by said fine-grained clay is used for further processing, the obtained fine-grained clay undergone the fine-grained clay adsorption is desorbed. Specifically, the conditions of sedimentation adsorption include: the usage of said fine-grained clay is 0.01-15 g, preferably 5-10 g. relative to 1 liter of the solution containing rare earth; the adsorption temperature is within a range of 1-50° C., preferably 15-40° C.; pH value may range from 6 to 12, preferably range from 8 to 11; and the adsorption time may be 0.5-24 hours, preferably 2-5 hours.

Since the coarse-grained clay has a relatively small saturated adsorption capacity and the column bed formed by the coarse-grained clay manifests a desirable permeability, the coarse-grained clay adsorption is fit for using a column bed adsorption. In particular, the conditions of column bed adsorption include: the adsorption temperature may be within a range of 1-50° C., preferably 15-40° C., pH value may range from 5 to 9, preferably range from 7 to 8. When the coarse-grained clay adsorption is a column bed adsorption, the size of said column bed and the loading of said coarse-grained clay may be reasonably selected according to practical requirements, and the unnecessary detailed description will not be provided herein. Furthermore, when the water adsorbed by said column bed contains rare earth with a concentration calculated by rare earth oxides higher than 0.5 mg/L, the coarse-grained clay in said column bed shall be renewed in due course.

The solution containing rare earth may further contain ammonia having a concentration calculated by nitrogen within a range of 20-500 mg/L, preferably 50-120 mg/L. In this case, the treating method for the solution containing rare earth preferably further comprises a step of adding sodium hydroxide, sodium carbonate or sodium hypochlorite into said solution containing rare earth and performing reaction prior to the process of fine-grained clay adsorption and/or during the process of fine-grained clay adsorption, and the usage of said sodium hydroxide or sodium carbonate and reaction conditions allow the obtained solution contains ammonia having a concentration calculated by nitrogen within a range of 15-100 mg/L, and the usage of said sodium hypochlorite and reaction conditions allow the obtained solution contains ammonia having a concentration calculated by nitrogen not higher than 15 mg/L. Applying such a treating method not only can recycle rare earth, but also can effectively remove ammonia nitrogen in the solution containing rare earth.

According to the present invention, sodium hypochlorite is particularly preferable added in the above step of removing ammonia nitrogen and perform a reaction. The usage of said sodium hypochlorite allows the molar ratio between ammonia calculated by nitrogen in the solution containing rare earth and the produced chlorine ($Cl_2$) is preferably 1:6-10, more preferably 1:7-9. In addition, the reaction conditions generally comprise: the reaction temperature may be within a range of 1-50° C., preferably 15-40° C.; the initial pH value may range from 6 to 12, preferably ranging from 8 to 11: and the reaction time may be 0.5-24 hours, preferably 2-5 hours. In the process, the concentration of ammonia nitrogen is reduced by allowing the sodium hypochlorite react with ammonia nitrogen and releasing nitrogen gas; the pH value of the reaction system will usually be reduced accompanied with the proceeding of reaction process, and when the reaction reaches an equilibrium, the pH value of said solution may be within a range of 6-12, preferably 6-9.

According to the present invention, when the solution containing rare earth contains ammonia nitrogen with a relatively high concentration (200-500 mg/L), regulating pH value by applying sodium hydroxide or sodium carbonate alone during the process of fine-grained clay adsorption cannot reduce the concentration of ammonia nitrogen to a desirable range, and the obtained solution adsorbed by said fine-grained clay still contain a certain amount of ammonia nitrogen (30-100 mg/L), and the solution may further contain a certain quantity of chloride ions and sodium ions; in another embodiment, in the process of fine-grained clay adsorption, although the concentration of ammonia nitrogen can drop to a required range by regulating pH value with sodium hypochlorite, the obtained solution adsorbed by said fine-grained clay may contain chloride ions with a concentration of 100-3,000 mg/L and/or sodium ions with a concentration of 100-3,000 mg/L. Therefore, according to a preferable embodiment of the present invention, when the solution adsorbed by said fine-grained clay contains ammonia having a concentration calculated by nitrogen within a range of 30-100 mg/L, and/or chloride ions with a concentration of 100-3,000 mg/L, and/or sodium ions with a concentration of 100-3,000 mg/L, the treating method for the solution containing rare earth further comprises a step of bipolar membrane electrodialysis of the solution adsorbed by said fine-grained clay after the process of fine-grained clay adsorption and prior to the coarse-grained clay adsorption, and the conditions of bipolar membrane electrodialysis allow the obtained solution contains ammonia with a concentration calculated by nitrogen not higher than 30 mg/L, and the concentrations of both chloride ions and sodium ions are less than 30 mg/L.

The process of bipolar membrane electrodialysis may be performed in a variety of existing bipolar membrane electrodialysis instrument. The bipolar membrane electrodialysis instrument generally comprises the acidic compartment, alkaline compartment, fresh water compartment and electrolyte water compartment, and its specific structure is well known to the person skilled in the art, the unnecessary detailed description will not be provided herein. The conditions of bipolar membrane electrodialysis generally comprise: the voltage between two electrodes may be within a range of 10-30 V, preferably 25-30 V; the retention time of the solution adsorbed by said fine-grained clay ranges from 10 to 60 minutes, preferably 20-40 minutes. Wherein, the retention time refers to the time period when the solution adsorbed by said fine-grained clay pass through the fresh water compartment.

According to the present invention, the method of desorbing rare earth in step (3) may be performed pursuant to a variety of existing methods, as long as the rare earth absorbed on said fine-grained clay and the coarse-grained clay can be desorbed, for example, it can be preformed by allowing the fine-grained clay undergone the fine-grained clay adsorption and the coarse-grained clay undergone the coarse-grained clay adsorption to contact with a sodium salt solution, thereby prepare a desorption solution. Furthermore, the rare earth in said desorption solution generally may be recycled by means of sedimentation or extraction, while the fine-grained clay and coarse-grained clay may be recycled.

Preferably, the method of desorbing rare earth from said fine-grained clay undergone the fine-grained clay adsorption includes immersing said fine-grained clay undergone the fine-grained clay adsorption with acidic sodium salt solution. The conditions of immersion generally comprises: the usage of said acidic sodium salt solution is within a range of 1-20 ml, preferably 5-10 ml relative to 1 g of said fine-grained clay undergone the fine-grained clay adsorption; the pH value of said acidic sodium salt solution may be more than zero and less than or equal to 6, preferably ranging from 1 to 3; the temperature of immersion may be 1-50° C., preferably 15-40; the time of immersion may be 10-90 minutes, preferably 20-60 minutes.

Preferably, the method of desorbing rare earth from said coarse-grained clay undergone the coarse-grained clay adsorption is performing with a column bed desorption by applying the sodium salt solution as a desorption solution. When the column bed desorption is performed, the flow direction of desorption solution (i.e., sodium salt solution) is opposite to the direction of adsorption solution in the process of adsorption. The conditions of column bed desorption generally comprise: the pH value of said sodium salt solution may range from 4 to 7, preferably 5 to 6; the temperature of desorption is within a range of 1-50° C., preferably 15-40° C.; the time of said sodium salt solution passing through the column bed may be 30-300 minutes, preferably 60-120 minutes. In addition, when the column bed desorption is performed, a weight ratio between the usage of sodium salt solution and that of coarse-grained clay may be 0.3-1:1, preferably 0.5-0.8:1.

According to a specific embodiment of the present invention, the solution containing rare earth contains rare earth, ammonia nitrogen, chloride ions and sodium ions, the treating method of said solution containing rare earth comprises:

(1) immersing the fine-grained clay and coarse-grained clay with neutral or acidic sodium chloride and/or sodium sulfate solution respectively, thereby obtain a $Na^+$ type fine-grained clay or a $Na^+$—$H^+$ type fine-grained clay and a $Na^+$ type coarse-grained clay or a $Na^+$—$H^+$ type coarse-grained clay; the grain diameter of at least 90% of said fine-grained clay particles is smaller than the grain diameter of said coarse-grained clay particles, and the grain diameter of said fine-grained clay is within a range of 1-250 μm, and the grain diameter of said coarse-grained clay is within a range of 150-1,000 μm;

(2) allowing the solution containing rare earth to contact with sodium hypochlorite, sodium hydroxide or sodium carbonate, and performing a fine-grained clay adsorption on the solution following a contact process with a $Na^+$ type fine-grained clay or a $Na^+$—$H^+$ type fine-grained clay, said contact process and the conditions of fine-grained clay adsorption allow the solution adsorbed by said fine-grained clay contains rare earth with a concentration calculated by rare earth oxides not higher than 1 mg/L; in addition, when the sodium hypochlorite is used in said contact process, it allows the solution adsorbed by said fine-grained clay has ammonia with a concentration calculated by nitrogen not higher than 15 mg/L; when the sodium hydroxide or sodium carbonate is used in said contact process, it allows the solution adsorbed by said fine-grained clay has ammonia with a concentration calculated by nitrogen within a range of 15-100 mg/L.

(3) performing bipolar membrane electrodialysis on the solution adsorbed by said fine-grained clay, the conditions of bipolar membrane electrodialysis allow the obtained solution contains ammonia with a concentration calculated by nitrogen not higher than 30 mg/L, and the concentrations of both chloride ions and sodium ions are less than 30 mg/L;

(4) performing a coarse-grained clay adsorption on the water treated by a bipolar membrane electrodialysis process with the $Na^+$ type coarse-grained clay or a $Na^+$—$H^+$ type coarse-grained clay, the conditions of coarse-grained clay adsorption allow the solution adsorbed by said coarse-grained clay contains rare earth with a concentration calculated by rare earth oxides not higher than 0.5 mg/L;

(5) desorbing rare earth from said fine-grained clay undergone the fine-grained clay adsorption and said coarse-grained clay undergone the coarse-grained clay adsorption, and recycling rare earth from the desorbed solution with a high concentration of rare earth by applying a method of precipitation or a method of extraction, wherein the desorbed fine-grained clay and coarse-grained clay are recyclable.

The present invention is described in details by means of following examples.

In the following examples and comparison examples, the concentration of rare earth, ammonia nitrogen and chloride are measured by means of arsenazo III spectrophotometer, Nessler's reagent spectrophotometer and mercury thiocyanate spectrophotometry respectively, in particular, measuring the absorbance of samples with the arsenazo III spectrophotometer, Nessler's reagent spectrophotometer and mercury thiocyanate spectrophotometry, and calculating the corresponding concentration of said rare earth, ammonia nitrogen and chloride respectively according to the calibration curves, wherein the calibration curves are respectively obtained by following steps:

The calibration curve of arsenazo III spectrophotometer: eight colorimetric tubes with the volume of 50 ml are respectively added with 0.00 ml, 2.00 ml, 3.00 ml, 4.00 ml, 5.00 ml, 6.00 ml, 8.00 ml and 10.00 ml standard working solution having a rare earth concentration of 2 mg/L (calculated by rare earth oxides), thus the corresponding content of rare earth in the above eight colorimetric tubes are 0.0 μg, 4.0 μg, 6.0 μg, 8.0 μg, 10.0 μg, 12.0 μg, 16.0 μg and 20.0 μg respectively, and then adding 10.0 ml acetic acid-sodium acetate buffer solution with a pH value of 3.30 into each of the colorimetric tubes respectively, subsequently adding water into said colorimetric tubes till the marking lines and shaking well, and further adding 2 ml arsenazo III chromogenic reagent with a concentration of 0.2 wt % respectively and shaking well, thereby obtain the test samples. Following a step of standing still for 20 minutes, the eight test samples are poured into eight cuvettes with a volume of 10 ml, measuring the absorbance under a wavelength 655 nanometer (nm) by applying reagent blank as a reference, and plotting a calibration curve by applying the measured absorbance as the vertical coordinate (Y-axis) and the corresponding content of rare earth (unit: μg) as the horizontal axis (X-axis).

The calibration curve of Nessler's reagent spectrophotometer: eight colorimetric tubes with the volume of 50 ml are respectively added with 0.00 ml, 0.50 ml, 1.00 ml, 2.00 ml, 4.00 ml, 6.00 ml, 8.00 ml and 10.00 ml standard working solution having an ammonia concentration of 10 mg/L (calculated by nitrogen), thus the corresponding content of ammonia nitrogen in the above eight colorimetric tubes are 0.0 μg, 5.0 μg, 10.0 μg, 20.0 μg, 40.0 μg, 60.0 μg, 80.0 μg and 100.0 μg respectively, subsequently adding water into said colorimetric tubes till the marking lines; then adding 1.0 ml potassium sodium tartrate solution into each of the colorimetric tubes and shaking well; further adding 1.5 ml Nessler's reagent and shaking well, thereby obtain the test samples. Following a step of standing still for 10 minutes, the eight test samples are poured into eight cuvettes with a volume of 20 ml, measuring the absorbance under a wavelength 420 nanometer (nm) by applying reagent blank as a reference, and plotting a calibration curve by applying the measured absorbance as the vertical coordinate (Y-axis) and the corresponding content of ammonia nitrogen (unit: μg) as the horizontal axis (X-axis).

The calibration curve of mercury thiocyanate spectrophotometry: eight colorimetric tubes with the volume of 50 ml are respectively added with 0.00 ml, 2.00 ml, 3.00 ml, 4.00 ml, 5.00 ml, 6.00 ml, 8.00 ml and 10.00 ml standard working solution having a sodium chloride concentration of 1 mg/L (calculated by chloride), thus the corresponding content of chloride in the above eight colorimetric tubes are 0.0 μg, 2.0 μg, 3.0 μg, 4.0 μg, 5.0 μg, 6.0 μg, 8.0 μg and 10.0 μg respectively, and then adding 8.0 ml nitric acid solution (wherein the volume ratio between nitric acid and water is 1:3) into each of the colorimetric tubes and shaking well; and further adding into 2.5 ml mercury thiocyanate with a concentration of 0.35 wt % respectively and shaking well; subsequently adding 2.5 ml ferric nitrate solution with a concentration of 150 g/L respectively and shaking well; afterwards adding water into said colorimetric tubes till the marking lines, thereby obtain the test samples. Following a step of standing still for 20 minutes, the eight test samples are poured into eight cuvettes with a volume of 20 ml, measuring the absorbance under a wavelength 460 nanometer (nm) by applying reagent blank as a reference, and plotting a calibration curve by applying the measured absorbance as the vertical coordinate (Y-axis) and the corresponding content of chloride (unit: μg) as the horizontal axis (X-axis).

The measurement of pH value in each of following examples and comparison examples is directly measured by means of pH-S analyzer.

Preparation Example 1

The preparation example is used for illustrating a method for preparing the fine-grained clay provided in the present invention.

A 1,000 g of dump leaching tailings (main ingredients are mica, kaoline and potassium feldspar, the same below) from Anyuan County in Jiangxi Province are sieved at 25° C. by a griddle with 100 mesh (150 μm, the same below), and the fine-grained clay with a grain diameter ranging 19-150 μm are sifted out. Take 100 g of the fine-grained clay, and vibrate and soak with 500 ml neutral sodium chloride aqueous solution having a concentration of 1.2 mol/L for 30 minutes, and then filter. The obtained solid phase product is washed with pure water, subsequently the washed product is dried at a temperature of 50° C., thereby obtain the $Na^+$ type fine-grained clay XN-1.

Preparation Example 2

The preparation example is used for illustrating a method for preparing the fine-grained clay provided in the present invention.

A 1,000 g of dump leaching tailings from Anyuan County in Jiangxi Province are sieved at 25° C. by a griddle with 100 mesh, and the fine-grained clay with a grain diameter ranging 19-150 μm are sifted out Take 100 g of the fine-grained clay, and vibrate and soak with 500 ml acidic sodium chloride aqueous solution having a concentration of 1.2 mol/l, and a pH value of 2 for 30 minutes, and then filter. The obtained solid phase product is washed with pure water, subsequently the washed product is dried at a temperature of 50° C., thereby obtain the $Na^+$—$H^+$ type fine-grained clay XN-2.

Preparation Example 3

The preparation example is used for illustrating a method for preparing the fine-grained clay provided in the present invention.

A 1,000 g of dump leaching tailings from Anyuan County in Jiangxi Province are vibrated and soaked at 25° C. with 5,000 ml pure water for 30 minutes, and the soaked product is sieved by a griddle with 100 mesh, and the fine-grained clay with a grain diameter ranging 19-150 μm are sifted out, and then the sifted clay is washed with pure water, and the washed product is subsequently dried at a temperature of 50° C. thereby obtain the fine-grained clay XN-3.

Take 10 g of the fine-grained clay XN-3, and vibrate and soak with 50 ml sulfuric acid solution having a pH value of 2.0 for 30 minutes, and then filter. The obtained solid phase product is washed with pure water, subsequently the washed product is dried at a temperature of 50° C., thereby obtain the $H^+$ type fine-grained clay XN-4.

Preparation Example 4

The preparation example is used for illustrating a method for preparing the coarse-grained clay provided in the present invention.

The oversize product obtained by sieving the dump leaching tailings from Anyuan County in Jiangxi Province as recited in Preparation Example 1 with a griddle with 100 mesh is sieved at 25° C. by a griddle with 20 mesh (804 µm, the same below), and the coarse-grained clay with a grain diameter ranging 150-804 µm are sifted out. Take 100 g of the coarse-grained clay, and vibrate and soak with 500 ml neutral sodium chloride aqueous solution having a concentration of 1.3 mol/L for 30 minutes, and then filter. The obtained solid phase product is washed with pure water, subsequently the washed product is dried at a temperature of 50° C., thereby obtain the $Na^+$ type coarse-grained clay CN-1.

Preparation Example 5

The preparation example is used for illustrating a method for preparing the coarse-grained clay provided in the present invention.

The oversize product obtained by sieving the dump leaching tailings from Anyuan County in Jiangxi Province as recited in Preparation Example 1 with a griddle with 100 mesh is sieved at 25° C. by a griddle with 20 mesh (804 µm), and the coarse-grained clay with a grain diameter ranging 150-804 µm are sifted out. Take 100 g of the coarse-grained clay, and vibrate and soak with 500 ml acidic sodium chloride aqueous solution having a concentration of 1.2 mol/L and a pH value of 2 for 30 minutes, and then filter. The obtained solid phase product is washed with pure water, subsequently the washed product is dried at a temperature of 50° C., thereby obtain the $Na^+$—$H^+$ type coarse-grained clay CN-2.

Test Example 1

The test example is used for illustrating the measurement of rare earth adsorption capacity of different fine-grained clays.

The equilibrium absorption capacity of the said fine-grained clays is determined by a batch equilibrium method. In detail, at 25° C., 0.1 g of the fine-grained clays XN-1, XN-2, XN-3, XN-4 are applied as adsorbent respectively and mixed with 30 ml solutions containing rare earth which contain 0, 0.25 mg, 0.30 mg, 0.35 mg, 0.40 mg, 0.50 mg, 0.60 mg, 0.70 mg, 0.80 mg and 0.90 mg rare earth calculated by rare earth oxides respectively. The equilibrium concentration of rare earth in the equilibrium solution after adsorption were determined and the equilibrium absorption capacity of 0.1 g of said fine-grained clays were calculated by a differential method. Subsequently the Langmuir adsorption isotherm equation is applied mechanically, a fitted curve is plotted by regarding the above-mentioned equilibrium concentration as the horizontal axis (X-axis), and the corresponding ratio of the equilibrium concentration to equilibrium absorption capacity as the vertical coordinate (Y-axis), and then a saturation adsorption capacity Qm (mg/g) and a correlation coefficient $R_L^2$ can be determined based on the fitted parameters of the adsorption isothermal curve, and the measurement result is as shown in Table 1. As illustrated in the results of Table 1, the adsorption capacity of rare earth performed by each of said fine-grained clays may be basically in accordance with the Langmuir adsorption model, and it pertains to monomolecular layer adsorption; however, the fine-grained clays treated with different modified methods manifest different adsorptive effect on the rare earth, and the fine-grained clay treated with neutral sodium chloride solution (the $Na^+$ type fine-grained clay) and the fine-grained clay treated with acidic sodium chloride solution (the $Na^+$—$H^+$ type fine-grained clay) exhibit a strong adsorption capacity with respect to rare earth, therefore, the $Na^+$ type fine-grained clay and $Na^+$—$H^+$ type fine-grained clay are preferred adsorbent.

TABLE 1

| fine-grained clay | saturation adsorption capacity Qm (mg/g) | correlation coefficient $R_L^2$ |
|---|---|---|
| XN-1 | 3.68 | 0.999 |
| XN-2 | 3.70 | 1.000 |
| XN-3 | 2.11 | 0.991 |
| XN-4 | 2.93 | 0.998 |

Test Example 2

The test example is used for illustrating the influence of a presence of ammonia nitrogen on the rare earth adsorption.

At 25° C., six samples of 30 ml mixed solutions which are with ammonia concentration calculated by nitrogen of 0, 9.6 mg/L, 24.1 mg/L, 48.7 mg/L, 89.0 mg/L, 241.4 mg/L respectively and with an rare earth concentration calculated by rare earth oxides of 13.3 mg/L are adopted, and then the six samples are vibrated and contacted with 0.100 g of fine-grained clay for 1 hour respectively, and the effects of adsorbing and removing rare earth are shown in FIG. 1. As illustrated in FIG. 1, both the equilibrium adsorption capacity and adsorption rate of rare earth are decreased with the increase of the concentration of ammonia nitrogen; when the concentration of ammonia calculated by nitrogen is less than 89.0 mg/L, the equilibrium adsorption capacity and adsorption rate of rare earth are sharply declined with the increase of concentration of ammonia nitrogen; when the concentration of ammonia calculated by nitrogen is greater than 89.0 mg/L, the decrease of adsorption equilibrium capacity and adsorption rate of rare earth are slowed down, but the adsorption rate is lower than 50%. As can be seen, with respect to the solution containing rare earth which comprises a high concentration of ammonia nitrogen, it shall be taken into consideration that a process of removing ammonia nitrogen is performed prior to the fine-grained clay adsorption and/or during the process of fine-grained clay adsorption.

Test Example 3

The test example is used for illustrating the influence of the sodium containing alkali compound and the initial pH value on the effect of removing ammonia nitrogen and pH value.

Figure 2:
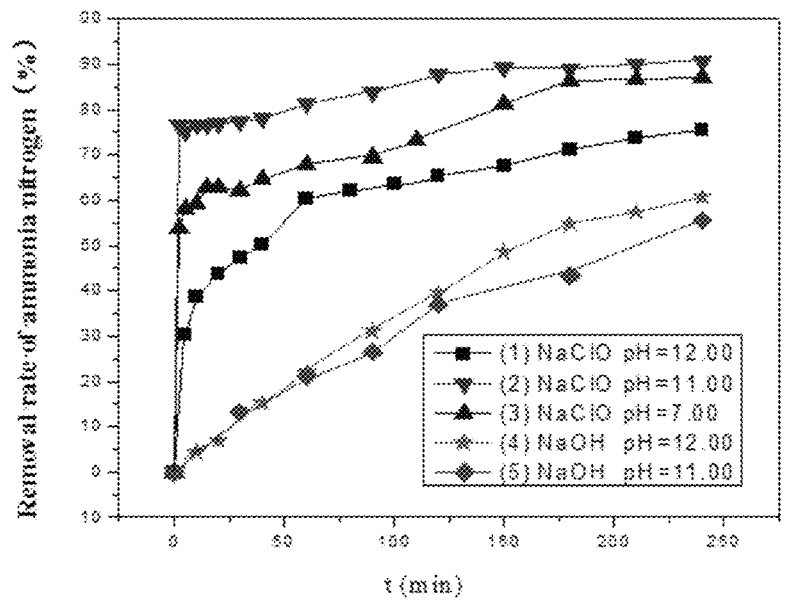
FIG. 2 is a result diagram illustrating the concentration of ammonia nitrogen varies with the conditions of alkaline treatment.
Figure 3:
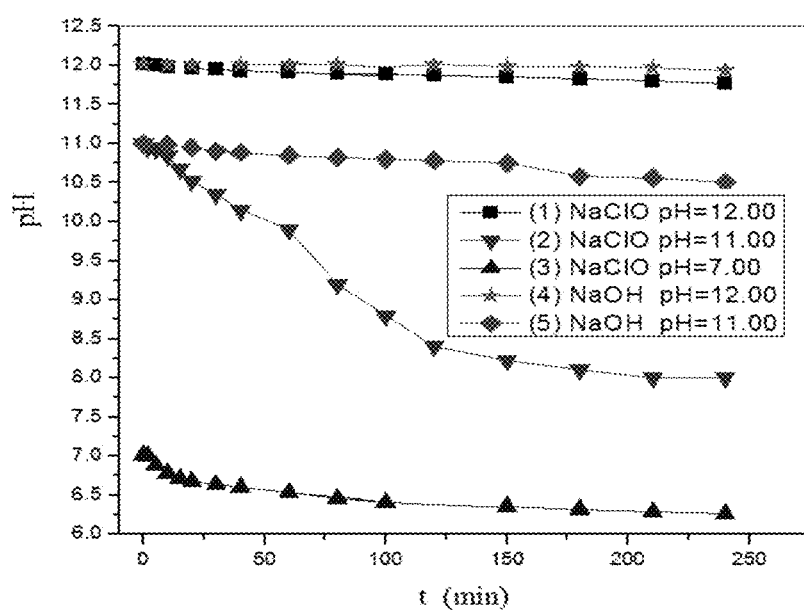
FIG. 3 is a result diagram illustrating the pH value of system varies as the reaction progress.

At 25° C., five samples of 500 ml simulation wastewater (having rare earth with a concentration calculated by rare earth oxides at 52.40 mg/L, and ammonia with a concentration calculated by nitrogen at 100.20 mg/L) is adopted. Under a condition of stirring, three samples thereof are added with sodium hypochlorite according to a ratio of 1:7 between nitrogen (N) and chlorine ($Cl_2$), and then the initial pH value of three samples of simulation wastewater are respectively regulated to 12, 11 and 7 by adding sulfuric acid, and each of the three samples is added with 2.5 g of a $Na^+$ type fine-grained clay XN-1. The above-mentioned samples are reacted with a stirring process, and the pH value and the concentration of ammonia nitrogen are measured, and a process of standing still and precipitation of the three samples for 2 hours is performed following 3 hours of stirring, and then a solid-liquid separation is carried out on the three samples by means of vacuum filtration. The pH values of two remaining samples of simulation wastewater are respectively regulated to 12 and 11 by adding sodium hydroxide, and each of the two samples is added with 2.5 g of a $Na^+$ type fine-grained clay XN-1. The above-mentioned samples are reacted with a stirring process, and the pH value and the concentration of ammonia nitrogen are measured and a process of standing still and precipitation of the two samples for 2 hours is performed following 3 hours of stirring, and then a solid-liquid separation is carried out on the two samples by means of vacuum filtration. As the reaction progress, the variations of the ammonia nitrogen concentration are illustrated in FIG. 2, and the variations of pH value are illustrated in FIG. 3. As shown in the result of FIG. 2, the effect of removing ammonia nitrogen for the sodium hypochlorite is significantly preferable than the removal effect of sodium hydroxide; in addition, when sodium hypochlorite is applied in the process of removing ammonia nitrogen in a solution, the removal effect is preferable when the initial pH value is within a range of 7-11. As shown in FIG. 3, when the sodium hydroxide with a pH1 value ranging from 7 to 11 is utilized for removing ammonia nitrogen in the solution, the pH value in the reaction system varies continuously as the reaction progress.

Example 1

The example is used for illustrating a treating method for a solution containing rare earth provided by the present invention.

(1) Fine-Grained Clay Adsorption:

At 25° C., 1,000 ml simulation wastewater (having rare earth with a concentration calculated by rare earth oxides at 46.34 mg/L, and ammonia with a concentration calculated by nitrogen at 56.79 mg/L) is adopted. Under a condition of stirring, the simulation wastewater is added with sodium hypochlorite solution according to a ratio of 1:8 between nitrogen (N) and chlorine ($Cl_2$), meanwhile the pH value of said solution is 12.5, and then the pH value of said solution is regulated to 11 by adding sulfuric acid, and the solution is further added with 5.00 g of a $Na^+$ type fine-grained clay XN-1 following a stirring process for 20 minutes, and then a process of standing still and precipitation of the solution for 2 hours is performed following 20 minutes of stirring, and a solid-liquid separation is carried out on the solution by means of vacuum filtration, thereby obtain a solution adsorbed by said fine-grained clay and the fine-grained clay undergone fine-grained clay adsorption, wherein the pH of the solution adsorbed by said fine-grained clay is 7.96, and the concentration of rare earth calculated by rare earth oxides is 0.68 mg/L, and the concentration of ammonia calculated by nitrogen is 13.71 mg/L.

(2) Coarse-Grained Clay Adsorption:

At 25° C., 70 g of the $Na^+$ type coarse-grained clay CN-1 is filled into a glass column with sand core having an inner diameter of 24 mm and a height of 200 mm, and the filling height of said $Na^+$ type coarse-grained clay CN-1 is 160 mm. The solution adsorbed by said fine-grained clay is added into the glass column with sand core via a funnel for adding liquid, and the height of liquid level inside the glass column with sand core is kept at about 35 mm by adjusting the stopcock of said funnel for adding liquid, and then the stopcock of said glass column with sand core is opened, and the effluent liquid is received by a 1,000 ml volumetric flask. The result shows that the effluent liquid contains rare earth with a concentration calculated by rare earth oxides at 0.11 mg/L, and ammonia with a concentration calculated by nitrogen at 7.85 mg/L.

(3) Desorption:

At 25° C., 50 ml of aqueous solution of sodium chloride having a concentration of 0.5 mol/L and a pH value of 1.03 is added into the fine-grained clay undergone fine-grained clay adsorption and then vibrated and soaked for 1 hour, subsequently the solid-liquid separation process is performed, thereby obtain the desorption solution, wherein the desorption solution contains rare earth with a concentration calculated by rare earth oxides at 831.01 mg/L, and ammonia with a concentration calculated by nitrogen at 1.02 mg/L.

In addition, at 25° C., a process of desorption is performed on the coarse-grained clay which has reached a saturated adsorption status following several times of accumulative adsorption, wherein the saturated adsorption capacity of rare earth is 0.786 mg/g, the saturated adsorption capacity of ammonia calculated by nitrogen is 0.101 mg/g, 100 ml neutral aqueous solution of sodium chloride with a concentration of 1.2 mol/L is introduced into a glass column with sand core filled with 70 g of the coarse-grained clay CN-1, and the retention time is controlled at 60 minutes, and then the effluent liquid is gathered, that is, the desorption solution which contains rare earth with a concentration calculated by rare earth oxides at 540.96 mg/L and ammonia with a concentration calculated by nitrogen at 70.36 mg/L is obtained.

Example 2

The example is used for illustrating a treating method for a solution containing rare earth provided by the present invention.

(1) Fine-Grained Clay Adsorption:

At 25° C., 1.000 ml simulation wastewater (having rare earth with a concentration calculated by rare earth oxides at 56.10 mg/L, ammonia with a concentration calculated by nitrogen at 51.29 mg/L, and chloride with a concentration calculated by chlorine at 451.82 mg/L) is adopted. Under a condition of stirring, the simulation wastewater is added with sodium hydroxide such that the pH value of said solution is regulated to 11, and the solution is further added with 10.00 g of a $Na^+$ type fine-grained clay XN-1 following a stirring process for 20 minutes, and then a process of standing still and precipitation of the solution for 2 hours is performed following 20 minutes of stirring, and a solid-liquid separation is carried out on the solution by means of vacuum filtration, thereby obtain a solution adsorbed by said fine-grained clay and the fine-grained clay undergone fine-grained clay adsorption, wherein the pH of the solution adsorbed by said fine-grained clay is 8.84, and the concentration of rare earth calculated by rare earth oxides is 0.74 mg/L, and the concentration of ammonia calculated by nitrogen is 40.82 mg/L, and the concentration of chloride calculated by chlorine is 452.50 mg/L.

(2) Bipolar Membrane Electrodialysis

At 25° C., the solution obtained following a process of fine-grained clay adsorption is added into the fresh water compartment of a bipolar membrane electrodialysis instrument, and then the circular flow is controlled at 80 Liter/hour, and the voltage is regulated at 25 V, and both the acidic compartment and alkaline compartment are poured with an aqueous solution of hydrochloric acid with a concentration of 0.025 mol/L, and the electrolyte water compartment is added with aqueous solution of sodium sulfate having a concentration of 3 wt %. After electrodialysis for 30 minutes, solution in the fresh water compartment has a pH of 7.01, rare earth with a concentration calculated by rare earth oxides at 0.50 mg/L, ammonia with a concentration calculated by nitrogen at 28.02 mg/L, and chloride with a concentration calculated by chlorine at 0.05 mg/L.

(3) Coarse-Grained Clay Adsorption:

At 25° C., 70 g of the $Na^+$ type coarse-grained clay CN-1 is filled into a glass column with sand core having an inner diameter of 24 mm and a height of 200 mm, and the filling height of said $Na^+$ type coarse-grained clay CN-1 is 160 mm. The solution undergone bipolar membrane electrodialysis is added into the glass column with sand core via a funnel for adding liquid, and the height of liquid level inside the glass column with sand core is kept at about 35 mm by adjusting the stopcock of said funnel for adding liquid, and then the stopcock of said glass column with sand core is opened, and the effluent liquid is received by a 1,000 ml volumetric flask. The result shows that the effluent liquid contains rare earth with a concentration calculated by rare earth oxides at 0.08 mg/L, ammonia with a concentration calculated by nitrogen at 21.50 mg/L, and chloride with a concentration calculated by chlorine at 0.05 mg/L.

(4) Desorption:

At 25° C., 100 ml of aqueous solution of sodium chloride having a concentration of 0.5 mol/L and a pH value of 1.07 is added into the fine-grained clay undergone fine-grained clay adsorption and then vibrated and soaked for 1 hour, subsequently the solid-liquid separation process is performed, thereby obtain the desorption solution, wherein the desorption solution contains rare earth with a concentration calculated by rare earth oxides at 963.26 mg/L, and ammonia with a concentration calculated by nitrogen at 1.60 mg/L.

In addition, at 25° C., a process of desorption is performed on the coarse-grained clay which has reached a saturated adsorption status following several times of accumulative adsorption, wherein the saturated adsorption capacity of rare earth is 0.806 mg/g, the saturated adsorption capacity of ammonia calculated by nitrogen is 0.097 mg/g, 100 ml neutral aqueous solution of sodium chloride with a concentration of 1.2 mol/L is introduced into a glass column with sand core filled with 70 g of the coarse-grained clay CN-1, and the retention time is controlled at 60 minutes, and then the effluent liquid is gathered, that is, the desorption solution which contains rare earth with a concentration calculated by rare earth oxides at 552.96 mg/L and ammonia with a concentration calculated by nitrogen at 62.64 mg/L is obtained.

Example 3

The example is used for illustrating a treating method for a solution containing rare earth provided by the present invention.

(1) Fine-Grained Clay Adsorption:

At 25° C., 2.000 ml simulation wastewater (having rare earth with a concentration calculated by rare earth oxides at 58.67 mg/L, ammonia with a concentration calculated by nitrogen at 60.31 mg/L, and chloride with a concentration calculated by chlorine at 450.43 mg/L) is adopted. Under a condition of stirring, the simulation wastewater is added with sodium hypochlorite solution according to a ratio of 1:9 between nitrogen (N) and chlorine ($Cl_2$), meanwhile the pH value of said solution is 12.4, and then the pH value of said solution is regulated to 11 by adding sulfuric acid, and the solution is further added with 10.00 g of a $Na^+$ type fine-grained clay XN-1 following a stirring process for 20 minutes, and then a process of standing still and precipitation of the solution for 3 hours is performed following 20 minutes of stirring, and a solid-liquid separation is carried out on the solution by means of vacuum filtration, thereby obtain a solution adsorbed by said fine-grained clay and the fine-grained clay undergone fine-grained clay adsorption, wherein the pH of the solution adsorbed by said fine-grained clay is 7.87, and the concentration of rare earth calculated by rare earth oxides is 0.81 mg/L, and the concentration of ammonia calculated by nitrogen is 14.11 mg/L, and the concentration of chloride calculated by chlorine is 1,553.71 mg/L.

(2) Bipolar Membrane Electrodialysis

At 25° C., the solution obtained following a process of fine-grained clay adsorption is added into the fresh water compartment of a bipolar membrane electrodialysis instrument, and then the circular flow is controlled at 80 Liter/hour, and the voltage is regulated at 25 V, and both the acidic compartment and alkaline compartment are poured with an aqueous solution of hydrochloric acid with a concentration of 0.025 mol/L, and the electrolyte water compartment is added with aqueous solution of sodium sulfate having a concentration of 3 wt %. After electrodialysis for 30 minutes, solution in the fresh water compartment has a pH of 7.14, rare earth with a concentration calculated by rare earth oxides at 0.49 mg/L, ammonia with a concentration calculated by nitrogen at 12.10 mg/L, and chloride with a concentration calculated by chlorine at 1.25 mg/L.

(3) Coarse-Grained Clay Adsorption:

At 25° C., 70 g of the $Na^+$ type coarse-grained clay CN-1 is filled into a glass column with sand core having an inner diameter of 24 mm and a height of 200 mm, and the filling height of said $Na^+$ type coarse-grained clay CN-1 is 160 mm. The solution undergone bipolar membrane electrodialysis is added into the glass column with sand core via a funnel for adding liquid, and the height of liquid level inside the glass column with sand core is kept at about 35 mm by adjusting the stopcock of said funnel for adding liquid, and then the stopcock of said glass column with sand core is opened, and the effluent liquid is received by a 1,000 ml volumetric flask. The result shows that the effluent liquid contains rare earth with a concentration calculated by rare earth oxides at 0.13 mg/L, ammonia with a concentration calculated by nitrogen at 9.41 mg/L, and chloride with a concentration calculated by chlorine at 1.20 mg/L.

(4) Desorption:

At 25° C., 100 ml of aqueous solution of sodium chloride having a concentration of 0.5 mol/L and a pH value of 1.10 is added into the fine-grained clay undergone fine-grained clay adsorption and then vibrated and soaked for 1 hour, subsequently the solid-liquid separation process is performed, thereby obtain the desorption solution, wherein the desorption solution contains rare earth with a concentration calculated by rare earth oxides at 1,029.91 mg/L, and ammonia with a concentration calculated by nitrogen at 0.32 mg/L.

In addition, at 25° C., a process of desorption is performed on the coarse-grained clay which has reached a saturated adsorption status following several times of accumulative adsorption, wherein the saturated adsorption capacity of rare earth is 0.836 mg/g, the saturated adsorption capacity of ammonia calculated by nitrogen is 0.095 mg/g, 100 ml neutral aqueous solution of sodium chloride with a concentration of 1.2 mol/L is introduced into a glass column with sand core filled with 70 g of the coarse-grained clay CN-1, and the retention time is controlled at 60 minutes, and then the effluent liquid is gathered, that is, the desorption solution which contains rare earth with a concentration calculated by rare earth oxides at 576.64 mg/L and ammonia with a concentration at 66.19 mg/L is obtained.

Example 4

The example is used for illustrating a treating method for a solution containing rare earth provided by the present invention.

At 25° C., 1,000 ml simulation wastewater (having rare earth with a concentration calculated by rare earth oxides at 49.32 mg/L, and ammonia with a concentration calculated by nitrogen at 54.81 mg/L) is adopted. The simulation wastewater is treated according to the method of Example 1, and the differences between the methods of Example 4 and Example 1 reside in that the $Na^+$ type fine-grained clay XN-1 in Example 1 is replaced by the same weight of the $Na^+$—$H^+$ type fine-grained clay XN-2, and the $Na^+$ type coarse-grained clay CN-1 in Example 1 is replaced by the same weight of the $Na^+$—$H^+$ type coarse grained clay CN-2, thereby obtain a solution adsorbed by said fine-grained clay and a effluent liquid adsorbed by said coarse-grained clay. The solution adsorbed by said fine-grained clay contains rare earth with a concentration calculated by rare earth oxides at 0.87 mg/L and ammonia with a concentration calculated by nitrogen at 12.89 mg/L; the effluent liquid adsorbed by said coarse-grained clay contains rare earth with an average concentration calculated by rare earth oxides at 0.10 mg/L and ammonia with an average concentration calculated by nitrogen at 8.49 mg/L.

Example 5

The example is used for illustrating a treating method for a solution containing rare earth provided by the present invention.

At 25° C., two samples of 500 ml simulation wastewater (having rare earth with a concentration calculated by rare earth oxides at 46.86 mg/L, and ammonia with a concentration calculated by nitrogen at 100.20 mg/L) are adopted. The two samples of simulation wastewater are treated according to the method of Example 1, and the differences between the methods of Example 5 and Example 1 reside in that the usage of the sodium hypochlorite allows the molar ratio between nitrogen (N) and chlorine (($Cl_2$) to be changed to 1:5 and 1:10 respectively. The solution adsorbed by said fine-grained clay following a treatment by adding sodium hypochlorite solution with a $N:Cl_2$ ratio of 1:5 contains rare earth with a concentration calculated by rare earth oxides at 0.62 mg/L and ammonia with a concentration of 48.82 mg/L; the solution adsorbed by said fine-grained clay following a treatment by adding sodium hypochlorite solution with a $N:Cl_2$ ratio of 1:10 contains rare earth with a concentration calculated by rare earth oxides at 0.58 mg/L and ammonia calculated by nitrogen with a concentration of 0.12 mg/L.

Example 6

The example is used for illustrating a treating method for a solution containing rare earth provided by the present invention.

The solution containing rare earth is treated according to the method of Example 1, and the difference between the methods of Example 6 and Example 1 resides in that the aqueous solution of sodium chloride having a pH value of 1.03 used in Example 1 is replaced by an aqueous solution of sodium chloride having a pH value of 5.63 during the desorption process of the fine-grained clay undergone fine-grained clay adsorption, thereby obtain the desorption solution. The desorption solution contains rare earth with a concentration calculated by rare earth oxides at 54.19 mg/l and ammonia with a concentration calculated by nitrogen of 0.98 mg/L.

Comparison Example 1

The comparison example is used for illustrating a treating method for a solution containing rare earth provided by the present invention.

The solution containing rare earth is treated according to the method of Example 1, and the difference between the methods of comparison example 1 and Example 1 resides in that the $Na^+$ type fine-grained clay XN-1 used in Example 1 is replaced by the same weight of the $Na^+$ type coarse-grained clay CN-1, and the effluent solution which is finally produced from said glass column with sand core contains rare earth with a concentration calculated by rare earth oxides at 4.02 mg/L and ammonia with a concentration calculated by nitrogen of 11.57 mg/L.

While some preferred embodiments of the present invention are described above, the present invention is not limited to the details in those embodiments. The person skilled in the art can make modifications and variations to the technical scheme of the present invention, without departing from the spirit of the present invention. However, all these modifications and variations shall be deemed as falling into the protected scope of the present invention.

In addition, it should be noted the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

What is claimed is:

1. A treating method for a solution containing rare earth, wherein the method comprises:
   (1a) performing a fine-grained clay adsorption on the solution containing rare earth with fine-grained clay to obtain a mixed solution, wherein said fine-grained clay adsorption is sedimentation adsorption;
   (1b) performing a solid-liquid separation operation on said mixed solution to remove the fine-grained clay from the mixed solution and to obtain a solution adsorbed by the fine-grained clay and a fine-grained clay undergone the fine-grained clay adsorption respectively;
   the conditions of the fine-grained clay adsorption allow that the concentration of the rare earth in said solution adsorbed by said fine-grained clay decrease to not higher than 1 mg/L, wherein the concentration of the rare earth is calculated by rare earth oxides;
   (2) performing a coarse-grained clay adsorption on said solution adsorbed by the fine-grained clay with coarse-grained clay, wherein said coarse-grained clay adsorption is column bed adsorption, to obtain a solution adsorbed by the coarse-grained clay and a coarse-grained clay undergone the coarse-grained clay adsorption;

the conditions of the coarse-grained clay adsorption allow that the concentration of the rare earth in said solution adsorbed by the coarse-grained clay decrease to not higher than 0.5 mg/L, wherein the concentration of the rare earth is calculated by rare earth oxide;

the grain diameter of at least 90% by weight of said fine-grained clay particles is smaller than the grain diameter of said coarse-grained clay particles, and the grain diameter of said fine-grained clay is within a range of 1-250 μm, and the grain diameter of said coarse-grained clay is within a range of 150-1,000 μm;

(3) desorbing rare earth from said fine-grained clay undergone the fine-grained clay adsorption and said coarse-grained clay undergone the coarse-grained clay adsorption.

2. The treating method according to claim 1, wherein said fine-grained clay is a $Na^+$ type fine-grained clay and/or a $Na^+$—$H^+$ type fine-grained clay, and/or said coarse-grained clay is a $Na^+$ type coarse-grained clay and/or a $Na^+$—$H^+$ type coarse-grained clay.

3. The treating method according to claim 2, wherein the $Na^+$ type fine-grained clay and $Na^+$ type coarse-grained clay are prepared by immersing said fine-grained clay and coarse-grained clay with sodium chloride and/or sodium sulfate solution or allowing said fine-grained clay and coarse-grained clay to carry out a column exchange with sodium chloride and/or sodium sulfate solution; the $Na^+$—$H^+$ type fine-grained clay and $Na^+$—$H^+$ type coarse-grained clay are prepared by immersing said fine-grained clay and coarse-grained clay with acidic sodium chloride and/or sodium sulfate solution or allowing said fine-grained clay and coarse-grained clay to carry out a column exchange with acidic sodium chloride and/or sodium sulfate solution.

4. The treating method according to claim 1, wherein major ingredients of said fine-grained clay and coarse-grained clay are the same or different, and the major ingredients of said fine-grained clay and coarse-grained clay are one or more selected from a group consisting of kaoline, halloysite, montmorillonite, zeolite, mica and feldspar independently.

5. The treating method according to claim 1, wherein the solution that is to be treated contains rare earth with a concentration calculated by rare earth oxides within a range of 5-300 mg/L.

6. The treating method according to claim 1, wherein the conditions of the sedimentation adsorption comprise: the usage of said fine-grained clay is 0.01-15 g relative to 1 liter of the solution containing rare earth, the adsorption temperature is within a range of 1-50° C., pH value is within a range of 6-12, and the adsorption time is within a range of 0.5-24 hours.

7. The treating method according to claim 1, wherein the conditions of the column bed adsorption comprise: the adsorption temperature is within a range of 1-50° C., pH value is within a range of 5-9.

8. The treating method according to claim 1, wherein desorbing rare earth from said fine-grained clay undergone the fine-grained clay adsorption in operation (3) comprises immersing said fine-grained clay undergone the fine-grained clay adsorption with acidic sodium salt solution.

9. The treating method according to claim 1, wherein a method of desorbing rare earth from said coarse-grained clay undergone the coarse-grained clay adsorption in operation (3) comprises performing a column bed desorption by applying sodium salt solution as a desorption solution.

10. The treating method according to claim 5, wherein the solution that is to be treated further has an ammonia nitrogen concentration within a range of 20-500 mg/L; the method further comprises an operation of adding sodium hydroxide, sodium carbonate or sodium hypochlorite into said solution containing rare earth and performing reaction prior to the process of fine-grained clay adsorption and/or during the process of fine-grained clay adsorption, and the usage of said sodium hydroxide or sodium carbonate and reaction conditions allow that the obtained solution contains an ammonia nitrogen concentration within a range of 15-100 mg/L, and the usage of said sodium hypochlorite and reaction conditions allow that the obtained solution contains an ammonia nitrogen concentration nitrogen not higher than 15 mg/L.

11. The treating method according to claim 10, wherein the usage of said sodium hypochlorite allows that the molar ratio between an ammonia nitrogen in the solution containing rare earth and the produced chlorine is 1:6-10; the reaction conditions comprise: the reaction temperature is within a range of 1-50° C., the initial pH value is within a range of 6-12, and the reaction time is within a range of 0.5-24 hours.

12. The treating method according to claim 1, wherein the solution adsorbed by said fine-grained clay contains ammonia having a concentration calculated by nitrogen within a range of 30-100 mg/L, and/or chloride ions with a concentration of 100-3,000 mg/L, and/or sodium ions with a concentration of 100-3,000 mg/L; the method further comprises an operation of bipolar membrane electrodialysis of the solution adsorbed by said fine-grained clay after the process of fine-grained clay adsorption and prior to the coarse-grained clay adsorption, and the conditions of bipolar membrane electrodialysis allow that the obtained solution contains ammonia with a concentration calculated by nitrogen not higher than 30 mg/L, and the concentrations of both chloride ions and sodium ions are less than 30 mg/L.

13. The treating method according to claim 12, wherein the conditions of bipolar membrane electrodialysis comprise: the voltage between two electrodes is within a range of 10-30 V, and the retention time of the solution adsorbed by said fine-grained clay is within a range of 10-60 minutes.

14. The treating method according to claim 2, wherein said fine-grained clay adsorption is sedimentation adsorption, and said coarse-grained clay adsorption is column bed adsorption.

15. The treating method according to claim 8, wherein the conditions of immersion comprises: the usage of said acidic sodium salt solution is within a range of 1-20 ml relative to 1 g of said fine-grained clay undergone the fine-grained clay adsorption, pH value of said acidic sodium salt solution is within a range of 1-3, the temperature of immersion is within a range of 1-50° C., and the time of immersion is within a range of 10-90 minutes.

16. The treating method according to claim 9, wherein the conditions of column bed desorption comprise: pH value of said sodium salt solution is within a range of 4-7, the temperature of desorption is within a range of 1-50° C., and the time of said sodium salt solution passing through column bed is within a range of 30-300 minutes.

17. The treating method according to claim 5, wherein the solution adsorbed by said fine-grained clay contains ammonia having a concentration calculated by nitrogen within a range of 30-100 mg/L, and/or chloride ions with a concentration of 100-3,000 mg/L, and/or sodium ions with a concentration of 100-3,000 mg/L; the method further comprises an operation of bipolar membrane electrodialysis of the solution adsorbed by said fine-grained clay after the process of fine-grained clay adsorption and prior to the coarse-grained clay adsorption, and the conditions of bipolar membrane electrodialysis allow the obtained solution contains ammonia with a concentration calculated by nitrogen not higher than 30 mg/L, and the concentrations of both chloride ions and sodium ions are less than 30 mg/L.

18. The treating method according to claim 10, wherein the solution adsorbed by said fine-grained clay contains ammonia having a concentration calculated by nitrogen within a range of 30-100 mg/L, and/or chloride ions with a concentration of 100-3,000 mg/L, and/or sodium ions with a concentration of 100-3,000 mg/L; the method further comprises an operation of bipolar membrane electrodialysis of the solution adsorbed by said fine-grained clay after the process of fine-grained clay adsorption and prior to the coarse-grained clay adsorption, and the conditions of bipolar membrane electrodialysis allow the obtained solution contains ammonia with a concentration calculated by nitrogen not higher than 30 mg/L, and the concentrations of both chloride ions and sodium ions are less than 30 mg/L.

* * * * *